United States Patent [19]

Abouzahr

[11] Patent Number: 5,934,737
[45] Date of Patent: Aug. 10, 1999

[54] DYNAMIC IMPACT ENERGY ABSORBING ASSEMBLY

[75] Inventor: Saad M. Abouzahr, Highland, Mich.

[73] Assignee: Chrysler Corporation, Auburn Hills, Mich.

[21] Appl. No.: 08/624,676

[22] Filed: Apr. 15, 1996

[51] Int. Cl.⁶ ............................................. B60J 5/00
[52] U.S. Cl. .................... 296/146.6; 296/188; 296/189; 428/910
[58] Field of Search .................. 296/189, 188, 296/146.6, 39.1, 191; 267/141, 153; 428/910; 293/120, 132

[56] References Cited

U.S. PATENT DOCUMENTS

| | | | |
|---|---|---|---|
| 3,860,279 | 1/1975 | Hulten | 293/72 |
| 4,061,815 | 12/1977 | Pool, Jr. | 428/215 |
| 4,076,570 | 2/1978 | Medley et al. | 156/244 |
| 4,079,161 | 3/1978 | Kile | 428/220 |
| 4,309,487 | 1/1982 | Holmes | 428/516 |
| 4,378,395 | 3/1983 | Asoshina et al. | 296/188 |
| 4,399,174 | 8/1983 | Tanaka et al. | 296/188 |
| 4,444,818 | 4/1984 | Tominaga et al. | 296/188 |
| 4,569,880 | 2/1986 | Nishiyama et al. | 296/189 |
| 4,635,981 | 1/1987 | Friton | 293/1 |
| 4,774,143 | 9/1988 | Gondela et al. | 428/442 |
| 4,805,924 | 2/1989 | Birchfield et al. | 280/752 |
| 4,879,165 | 11/1989 | Smith | 296/188 |
| 4,901,500 | 2/1990 | Wycech | 52/793 |
| 4,945,002 | 7/1990 | Tanuma et al. | 428/425.6 |
| 5,306,549 | 4/1994 | Isozaki et al. | 428/910 |
| 5,314,228 | 5/1994 | Figge, Sr. | 296/146.6 |
| 5,395,135 | 3/1995 | Lim et al. | 296/189 |
| 5,401,559 | 3/1995 | Okamota et al. | 428/910 |
| 5,419,088 | 5/1995 | Raymond et al. | 52/1 |
| 5,427,842 | 6/1995 | Bland et al. | 428/910 |
| 5,441,802 | 8/1995 | Mizuno et al. | 428/910 |
| 5,506,030 | 4/1996 | Landers et al. | 428/910 |
| 5,527,601 | 6/1996 | Crighton et al. | 428/910 |
| 5,562,996 | 10/1996 | Kuriu et al. | 428/910 |
| 5,585,177 | 12/1996 | Okamura et al. | 428/910 |
| 5,609,383 | 3/1997 | Cahill | 296/39.1 |
| 5,707,098 | 1/1998 | Uchida et al. | 296/189 |

*Primary Examiner*—D. Glenn Dayoan
*Assistant Examiner*—Jason Morrow
*Attorney, Agent, or Firm*—William J. Coughlin

[57] ABSTRACT

A dynamic impact energy absorbing assembly for a motor vehicle includes an inner panel, an outer panel joined to the inner panel in spaced relation to define a cavity therebetween, and an energy management panel disposed in the cavity to absorb energy of an impact on the outer panel.

15 Claims, 1 Drawing Sheet

DYNAMIC IMPACT ENERGY ABSORBING ASSEMBLY

BACKGROUND OF THE INVENTION

1. Field of the Invention

The present invention relates generally to vehicle impact absorption and, more particularly, to a dynamic impact energy absorbing assembly for a vehicle.

2. Description of the Related Art

Typically, vehicle doors have an inner panel and an outer panel joined together in spaced relation such that a door cavity is defined therebetween. The door also has a decorative door trim panel mounted to the inner panel.

It is also known that motor vehicles may collide with obstacles and with each other during operation. As a result, motor vehicles have been provided with various structures to lessen the effects of a collision type impact on an occupant compartment of the vehicle. For example, some motor vehicles have a door guard beam disposed in the door cavity to resist side impact intrusion. However, such devices suffer from the disadvantage of added weight, assembly time and expense to the motor vehicle.

SUMMARY OF THE INVENTION

It is, therefore, one object of the present invention to provide a dynamic impact energy absorbing assembly for a motor vehicle.

It is another object of the present invention to provide a side impact energy absorbing assembly for a motor vehicle.

It is yet another object of the present invention to provide a knee bolster impact energy absorbing assembly for a motor vehicle.

It is still another object of the present invention to provide an impact energy absorbing assembly which is less expensive and less in weight than conventional impact intrusion resistant devices.

To achieve the foregoing objects, the present invention is an impact energy absorbing assembly for a motor vehicle including an inner panel and an outer panel joined to the inner panel in spaced relation to define a cavity therebetween. The impact energy absorbing assembly also includes an energy management panel disposed in the cavity to absorb energy of an impact on the outer panel.

One advantage of the present invention is that a dynamic impact energy absorbing assembly is provided for a motor vehicle. Another advantage of the present invention is that a side impact energy absorbing assembly is provided for a motor vehicle. Yet another advantage of the present invention is that a knee bolster impact energy absorbing assembly is provided for a motor vehicle. Still another advantage of the present invention is that the dynamic impact energy absorbing assembly is less expensive and less in weight than conventional impact intrusion resistant devices.

Other objects, features and advantages of the present invention will be readily appreciated as the same becomes better understood after reading the subsequent description when taken in conjunction with the accompanying drawings.

DESCRIPTION OF THE PREFERRED EMBODIMENT(S)

Figure 1:
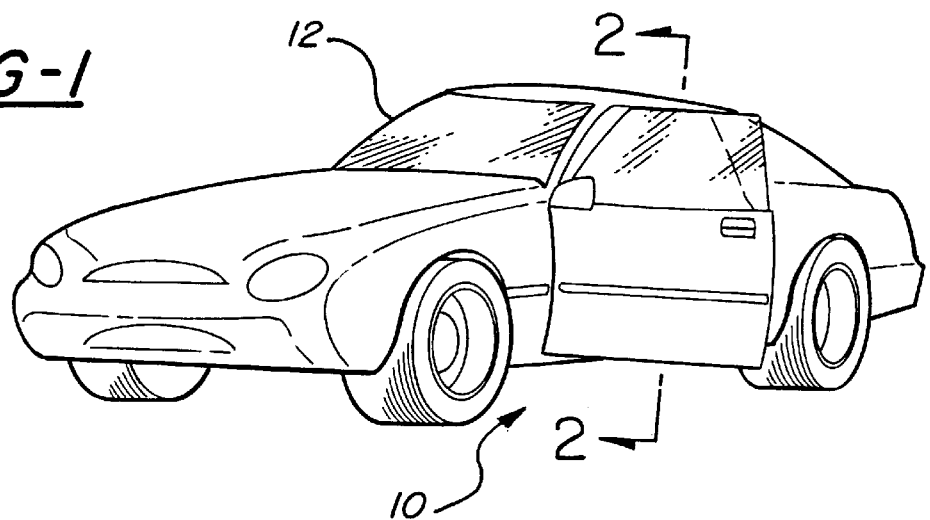
FIG. 1 is a perspective view of a dynamic impact energy absorbing assembly, according to the present invention, illustrated in operational relationship with a motor vehicle.

Referring to FIG. 1, a dynamic impact energy absorbing assembly 10, according to the present invention, is illustrated in operational relationship with a motor vehicle 12 such as an automotive vehicle. As illustrated, the impact energy absorbing assembly 10 is a door but may take other forms such as a body side or knee bolster (not shown) of the motor vehicle 12.

Figure 2:
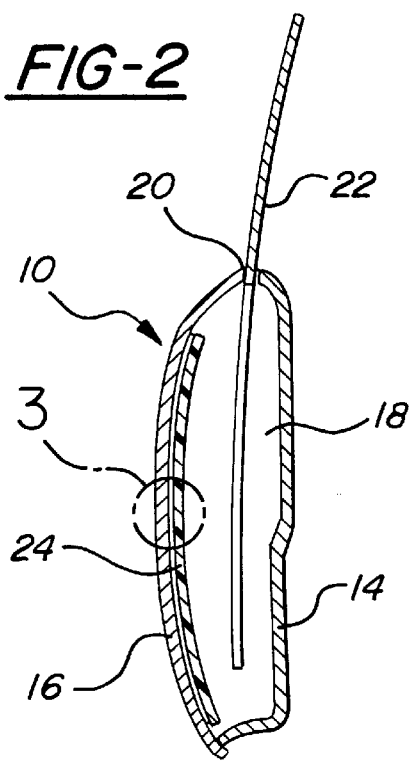
FIG. 2 is a sectional view taken along sight line 2—2 of FIG. 1.

Referring to FIG. 2, the impact energy absorbing assembly 10 includes an inner panel 14 and an outer panel 16 joined to the inner panel 14 in spaced relation to define a space or cavity 18 therebetween. In one embodiment, the impact energy absorbing assembly 10 also includes an aperture 20 at an upper end for receiving a window 22. The window 22 may move in and out of the cavity 18 as is known in the art. It should be appreciated that the impact energy absorbing assembly 10 may include a window regulator device and other components of a vehicle door as is known in the art.

Figure 3:
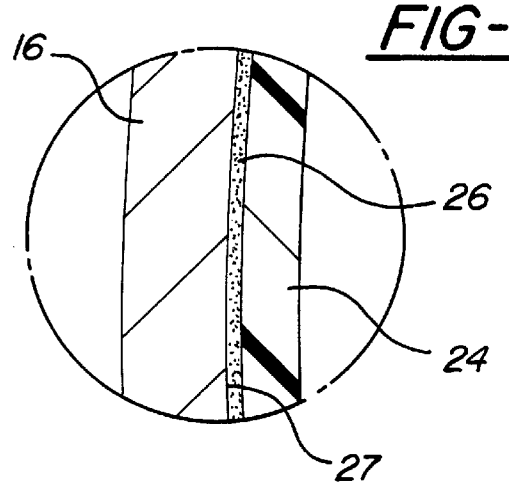
FIG. 3 is an enlarged view of a portion in circle 3 of FIG. 2.
Figure 4:
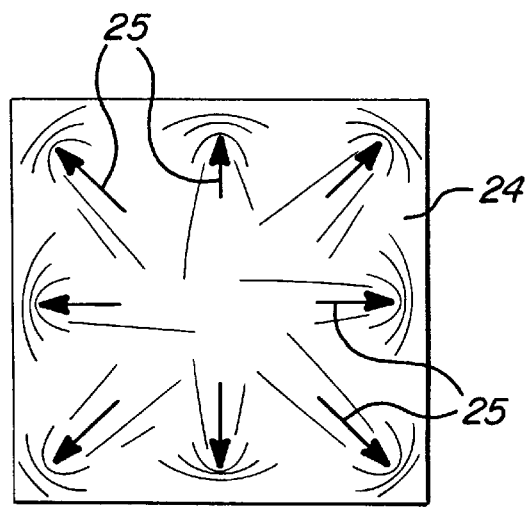
FIG. 4 is an elevational view of the dynamic impact energy absorbing assembly of FIG. 1 illustrating orientation of polymer chains.

Referring to FIGS. 2 and 3, the impact energy absorbing assembly 10 also includes an energy management panel 24 disposed in the cavity 18 to absorb energy of an impact on the outer panel 16. The energy management panel 24 is made from at least one biaxially orientated polymer sheet or film. The polymer sheet is fabricated from a thermoplastic material such as polyethylene, polycarbonate, polyester, polypropylene or the like. The thermoplastic material may be a polymer blend or copolymer such as ABS. The polymer sheet is pre-stretched as indicated by the arrows 25 in FIG. 4 to orientate the polymer chains in amount of at least 50% or greater. The polymer sheet has a thickness from about 0.5 millimeters to about 25 millimeters. Alternatively, the energy management panel 24 may have a plurality of polymer sheets layered with orientated polymer fibers or chains in different directions as indicated by the arrows 25. The polymer sheets have polymer chains orientated at angles to each other on adjacent sheets. The polymer sheets are made of a material having a low glass transition temperature, preferably lower than the application temperature of the material. It should be appreciated that the choice of material is not based on the strength of the material.

Prior to assembly, the energy management panel 24 is heated to a temperature above its glass transition temperature and stretched in at least two directions as indicated by the arrows 25. The energy management panel 24 is cooled to a temperature below its glass transition temperature to retain its morphology. The energy management panel 24 is disposed in the cavity between the inner panel 14 and outer panel 16. Preferably, the energy management panel 24 is laminated by an adhesive 26 to an inner surface 27 of the outer panel 16. It should be appreciated that the energy management panel 24 may be wedged in the cavity 18 or fastened to the inner panel 14 or outer panel 16 farthest away from the impact force.

In operation, an impact force may be applied to the outer panel 16 causing the outer panel 16 to intrude toward the inner panel 14. The energy management panel 24 receives the impact force and absorbs the impact force by changing its morphology. The highly orientated polymer chains in the polymer sheet, under the second law of thermodynamics, contract under stress and return to a random orientation or state. As the polymer chains contract, they prevent intrusion. The energy management panel 24 absorbs up to four times the amount of the impact force to prevent intrusion of the outer panel 16.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A dynamic impact energy absorbing door assembly for a motor vehicle comprising:

an inner panel:

an outer panel joined to said inner panel in a spaced relation to define a cavity therebetween, said outer panel having a vertical surface; and an energy management panel disposed in the cavity and attached to the outer panel to absorb the energy of an impact on said outer panel and thereby resist penetration into said cavity, said panel consisting of a plurality of flexible polymer sheets;

said energy management panel being substantially flat and covering a substantial portion of said vertical surface of said outer panel.

2. A dynamic impact energy absorbing door assembly as set forth in claim 1 wherein said energy management panel comprises at least one polymer sheet having polymer chains orientated in at least one direction.

3. A dynamic impact energy absorbing door assembly as set forth in claim 2 wherein said at least one polymer sheet is pre-stretched above its glass transition temperature.

4. A dynamic impact energy absorbing door assembly as set forth in claim 1 wherein each of said polymer sheets have polymer chains orientated in at least one direction.

5. A dynamic impact energy absorbing door assembly as set forth in claim 1 wherein said energy management panel is made of a material selected of one of group consisting of polyethylene, polycarbonate, polyester and polypropylene.

6. A dynamic impact energy absorbing door assembly as set forth in claim 1 wherein said energy management panel has a thickness from about 0.5 millimeters to about 25 millimeters.

7. A dynamic impact energy absorbing door assembly as set forth in claim 1 wherein each of said plurality of flexible polymer sheets is a biaxially orientated polymer sheet.

8. A dynamic impact energy absorbing door assembly as set forth in claim 1 wherein said energy management panel is either one of a plate and a film.

9. A dynamic impact energy absorbing door assembly for a motor vehicle comprising:

an inner panel:

an outer panel joined to said inner panel in spaced relation to define a cavity therebetween, said outer panel being having a vertical surface; and at least one biaxially orientated polymer sheet disposed in the cavity and attached to the outer panel to absorb energy of an impact on said outer panel and thereby resist penetration into said cavity;

said at least one biaxially oriented polymer sheet being substantially flat and covering a substantial portion of said vertical surface of said outer panel.

10. A dynamic impact energy absorbing door assembly as set forth in claim 9 wherein said at least one biaxially orientated polymer sheet is pre-stretched above its glass transition temperature.

11. A dynamic impact energy absorbing door assembly as set forth in claim 9 wherein said at least one biaxially oriented polymer sheet is made of a material selected of one of a group consisting of polyethylene, polycarbonate, polyester and polypropylene.

12. A dynamic impact energy absorbing door assembly as set forth in claim 9 wherein said at least one biaxially orientated polymer sheet has a thickness from about 0.5 millimeters to about 25 millimeters.

13. A method of resisting penetration into a door of a motor vehicle including an inner panel and an outer panel, the method comprising the steps of:

providing a polymer sheet;

biaxially orienting the polymer sheet; and attaching said polymer sheet to the outer panel along a substantial portion of a vertical length of the outer panel.

14. The method of resisting penetration into a door of a motor vehicle of claim 13, wherein said step of biaxially orienting the polymer sheet includes the step of pre-stretching said polymer sheet above its glass transition temperature.

15. The method of resisting penetration into a door of a motor vehicle of claim 15, wherein the step of attaching said polymer sheet to the outer panel comprises the step of attaching a plurality of polymer sheets to the outer panel.

* * * * *